(12) United States Patent
Rogers et al.

(10) Patent No.: US 11,803,051 B1
(45) Date of Patent: Oct. 31, 2023

(54) FREEFORM OPTICAL SURFACE AND METHOD OF FORMING A FREEFORM OPTICAL SURFACE

(71) Applicant: Synopsys, Inc., Mountain View, CA (US)

(72) Inventors: John Rice Rogers, Pasadena, CA (US); Bryan D. Stone, Marlborough, MA (US)

(73) Assignee: Synopsys, Inc., Sunnyvale, CA (US)

( * ) Notice: Subject to any disclaimer, the term of this patent is extended or adjusted under 35 U.S.C. 154(b) by 457 days.

(21) Appl. No.: 16/874,517

(22) Filed: May 14, 2020

Related U.S. Application Data

(60) Provisional application No. 62/847,414, filed on May 14, 2019.

(51) Int. Cl.
   *G02B 27/00* (2006.01)
   *G06T 17/30* (2006.01)

(52) U.S. Cl.
   CPC ..... *G02B 27/0012* (2013.01); *G02B 27/0025* (2013.01); *G06T 17/30* (2013.01)

(58) Field of Classification Search
   CPC ........... G02B 27/0012; G02B 27/0025; G02B 27/005; G02B 3/02; G02B 3/04; G06T 17/30
   See application file for complete search history.

(56) References Cited

U.S. PATENT DOCUMENTS

| | | | |
|---|---|---|---|
| 7,929,114 B2 | 4/2011 | Mann | |
| 9,964,444 B2 | 5/2018 | Rolland et al. | |
| 10,234,689 B1 | 3/2019 | Brand | |
| 2016/0170190 A1* | 6/2016 | Hou | G02B 17/0642 359/859 |
| 2018/0321736 A1 | 11/2018 | Masson | |
| 2020/0386925 A1* | 12/2020 | Rogers | G02B 27/0012 |

OTHER PUBLICATIONS

Forbes, "Characterizing the shape of freeform optics," Optics Express, vol. 20, No. 3, pp. 2483, 2499, (Jan. 30, 2012).
Cardona-Nunez, et al., "Conic that best fits an off-axis conic section," Applied Optics, vol. 25, No. 19, pp. 3585-3588, (Oct. 1, 1986).
Forbes, "Manufacturability estimates for optical aspheres," Optics Express, vol. 19, No. 10, pp. 9923-9941, (May 9, 2011).
Papa, et al., "Starting point designs for freeform four-mirror systems," Optical Engineering, 57(10), 101705 1-11, (2018).
Rakich, "The 100th Birthday of the conic constant and Schwarzschild's revolutionary papers in optics," Proc. SPIE 5875, Novel Optical systems Design and Optimization VIII, 587501, (Aug. 18, 2005).
Thompson, et al., "The Forbes Polynomial: A more predictable surface for fabricators," Optical Society of America, (2010).

(Continued)

*Primary Examiner* — Derek S. Chapel
*Assistant Examiner* — Adam W Booher
(74) *Attorney, Agent, or Firm* — Weaver Austin Villeneuve & Sampson LLP

(57) ABSTRACT

A freeform optical surface includes, in part, an off-axis optical surface and a departure optical module. The off-axis optical surface may be an off-axis conic optical surface. The departure optical module may be substantially perpendicular to the off-axis conic optical surface.

6 Claims, 7 Drawing Sheets

(56) References Cited

OTHER PUBLICATIONS

Meada, "Zernike Polynomials and Their Use in Describing the Wavefront Aberrations of the Human Eye," Psych 221/EE 362, Applied Vision and Imaging Systems, Course Project, (Winter 2003).
Born, et al., "Expansion of the Aberration Function," Principles of Optics, $6^{th}$ Edition, Section 9.2 (1993).
Smith, Modern Optical Engineering, $4^{th}$ Ed. McGraw-Hill Professional (chapter containing the pp. 512-515), (2008).
Kingslake, et al., Lens Design Fundamentals, $2^{nd}$ ed., Sec. 6.1, Surface Contribution Formulas (Academic Press 2010).
Shannon, The art of Science of Optical Design, 3—Aberations, Cambridge University Press, Cambridge, UK, pp. 164-264, (1997).
Walther, The Ray and Wave Theory of Lenses, Sec. 2.3, Path differentials. pp. 20-27, (Cambridge 1995).
U.S. Non-Final office Action dated Jun. 27, 2022 in U.S. Appl. No. 16/896,079.
U.S. Restriction Requirement dated Feb. 28, 2022 U.S. Appl. No. 16/896,079.
U.S. Final Office Action dated Apr. 19, 2023 in U.S. Appl. No. 16/896,079.

\* cited by examiner $$z(x,y) = \frac{c(x^2+y^2)}{1+\sqrt{1-c^2(\kappa+1)(x^2+y^2)}} \quad \text{equation (1)}$$

$$\tilde{z}_{base}(\tilde{x},\tilde{y}) = \frac{c\sqrt{k_1(\tilde{x}^2 + k_1\tilde{y}^2)}}{1 - k_2\tilde{y} + \sqrt{1 - 2k_2\tilde{y} - c^2 k_1[(1+\kappa\cos^2\omega)\tilde{x}^2 + (1+\kappa)\tilde{y}^2]}} \quad \text{equation (2)}$$

FIG. 7A $$k_1 = 1 + \kappa\sin^2\omega$$
$$k_2 = c\kappa\sqrt{k_1}\cos\omega\sin\omega$$

equation (2) variables

FIG. 7B $$\tilde{z}_{total}(\tilde{x},\tilde{y}) = \tilde{z}_{base}(\tilde{x},\tilde{y}) + D(\tilde{x},\tilde{y})$$

Where $D(\tilde{x},\tilde{y})$ denotes the added departure from the base surface.

equation (3)

FIG. 8

$$\tilde{N} = \left(\frac{\partial}{\partial \tilde{x}} \tilde{z}_{total}(\tilde{x},\tilde{y}), \frac{\partial}{\partial \tilde{y}} \tilde{z}_{total}(\tilde{x},\tilde{y}), -1\right)$$

differentiating equation (3)

FIG. 9

FREEFORM OPTICAL SURFACE AND METHOD OF FORMING A FREEFORM OPTICAL SURFACE

CROSS REFERENCE TO RELATED APPLICATIONS

The present application claims benefit under 35 USC 119 (e) of U.S. provisional Application No. 62/847,414, filed May 14, 2019, entitled "An Improved Electronic Structure For Representing Freeform Optical Surfaces In Optical Design Software", the content of which is incorporated herein by reference in its entirety.

TECHNICAL FIELD

The present disclosure relates to freeform optical surfaces.

BACKGROUND

In freeform optical surface design, an optical subassembly is composed of one or more individual freeform optical surface and/or mirror elements. Selecting the shapes (or as it is often termed, the figures) of the individual surfaces of the freeform optical surface or mirror elements is an important step in the design process. Historically, surface figures for applications like freeform optical surfaces for cameras were primarily restricted to be a portion of a sphere. This was a practical consideration: portions of spheres are significantly easier to manufacture and test than non-spherical surfaces.

As fabrication and testing technology has improved, the use of surfaces that are rotationally symmetric, but neither spherical nor conic, has increased. The additional degrees of freedom afforded by the use of such surfaces allows for better image quality or for fewer elements (or both) when compared with optical subassemblies that use only spherical surfaces.

More recently, it has become increasingly practicable to manufacture and test surfaces that have no axis of rotational-symmetry. These surfaces may have a plane of symmetry or they may have no underlying symmetry at all. These so-called freeform surfaces offer additional degrees of freedom that are important for applications that include reflecting surfaces where the mirrors are tilted and/or decentered, so that the overall system is unobstructed. Technology areas where such considerations are important include aerospace, virtual reality, augmented reality, etc. An example of an unobstructed mirror system that can benefit from the use of freeform surfaces is shown in cross-section in FIG. 1.

While there are multiple representations for a freeform surface, the particular representation that is used in an optical design package can significantly influence optimization, tolerancing, and the manufacturability of an element that includes such freeform surfaces. Current representations fail to provide all of the features that are desired in a freeform surface representation.

For example, one paper, G. W. Forbes, "Characterizing the shape of freeform optics," Opt. Express 20, 2483-2499 (2012), allows for the possibility that the polynomial departure be transversely displaced from the vertex of a conic, but still applied in a coordinate system aligned with, the axis of the conic. Therefore, even though the departure can be centered on some off-axis point on the surface, the departure is applied in a direction parallel to the axis of the conic and cannot, therefore, extend beyond a point where the surface becomes parallel to the axis of the conic. Furthermore, such a description is problematic in a practical sense when the departure direction becomes nearly parallel to the axis of the conic.

In another paper, Jonathan C. Papa, Joseph M. Howard, Jannick P. Rolland, "Starting point designs for freeform four-mirror systems," Opt. Eng. 57(10) 101705 (21 Jun. 2018), allows for a single, rotationally-symmetric quartic term to be added to a base conic, and this quartic could be centered at an off-axis point on the conic and added in a direction that is not parallel to the base conic. This departure is targeted to correction of specific, low-order aberrations and does not allow for general freeform surface configurations. See also, for example, Section 2.3 of A. Walther, The Ray and Wave Theory of Freeform optical surfaces (Cambridge, 1995) and, for example, Section 6.1 of Rudolph Kingslake and R. Barry Johnson, *Freeform optical surface Design Fundamentals,* 2nd ed. (Academic Press, 2010).

For optical design applications that employ freeform surface shapes, it is important for the successful design and manufacture to have a representation for the freeform surfaces that possesses at least three properties:

1. The representation should be stable as the system is optimized and the parameters that represent the surface figure are modified.
2. It should be straightforward to determine how easy it will be to manufacture and test the surface.
3. The representation should provide degrees of freedom necessary to correct the aberrations in the system.

The first is essential for successful design of optical subassemblies. If a surface representation cannot be used successfully with modern optimization algorithms in existing freeform optical surface design packages, then the ability of the freeform optical surface designer to use such surfaces in their design is severely hampered.

The second enables a freeform optical surface designer to incorporate constraints into the design and optimization process that ensure surface figures in the final design meet two goals: 1) the imaging and packaging requirements are met, and 2) the surfaces can be manufactured and tested.

The third property is important to obtain the most benefit in the design from a freeform surface. From the standpoint of aberration theory, when rotational-symmetry is broken, there is an increase in the number of aberrations that can be present in the system. Having degrees of freedom in the surface figure that can be varied independently to correct the various aberrations is advantageous when designing systems that break rotational-symmetry.

Existing representations for freeform surfaces fail to satisfy the above three requirements for the more general freeform surfaces.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

FIGS. 7A and 7B depict Equation 2 and the variables k1 and k2.

FIG. 8 depicts Equation 3.

FIG. 9 depicts and equation for differentiating Equation 3.

DETAILED DESCRIPTION

Aspects of the present disclosure relate to an optical structure that includes an off-axis optical surface and a departure module. The off-axis optical surface may be an off-axis conic optical surface and may receive the departure along a substantially perpendicular direction.

Embodiments of the present invention provide a freeform surface in at least two parts that include a base surface together with a deviation (or departure) in surface height and slope from the base surface. It is advantageous if the base surface is of a form that is easy to fabricate and/or test, so that the challenges to the fabrication and testing of the surface are posed only by the (typically small) deviations from the base surface. It is furthermore advantageous if the base surface, by itself, provides at least an approximate solution to the optical design problem, so that the deviations that are required from the base surface remain small. The base surface may be specified by a relatively simple surface representation. One common class of base surface is a conic section of revolution.

The second part of the surface representation is the deviation (or departure) from the base surface. It is this deviation that provides the additional degrees of freedom to give a truly "freeform" surface. This departure from the base surface can be specified in a number of ways. For example, sets of polynomials, such as Zernike polynomials or Forbes Freeform Q-polynomials, have been proposed, although other basis functions could be used.

Splitting a surface representation into two parts in this way—a base surface plus additional departure—is a relatively standard approach in freeform optical surface design. However, the way that the additional departure has been applied in the past needs to be improved upon, and needs to be modified in the context of freeform surfaces. Embodiments of the present invention provides such improvements, as described further below.

Figure 1:
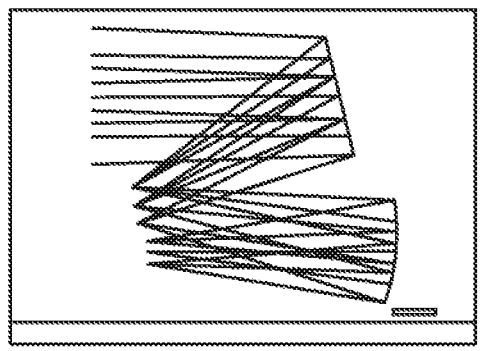
FIG. 1 depicts an example of an unobstructed mirror system.
Figure 2:
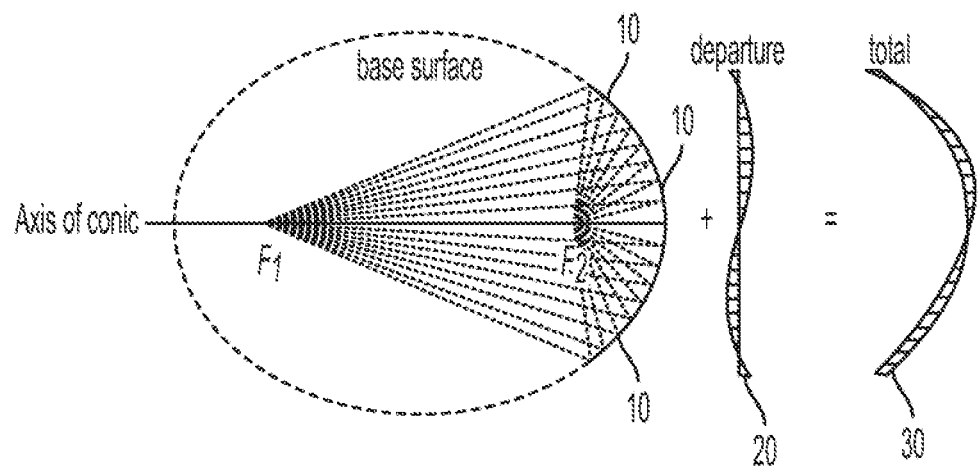
FIG. 2 depicts a schematic representation of a base surface together with an additional departure to give a total surface figure for a surface in an optical subassembly.

To better understand surface representations, consider a base surface represented by a conic of revolution. In this case, the surface has an underlying axis of rotational symmetry, and in existing approaches, the departure is added to the base surface along the direction of this axis. This is represented schematically in cross-section in FIG. 2. The solid portion 10 of the base conic is the part of the conic that is illuminated (as represented by the dashed-rays that have been drawn between $F_1$ and $F_2$, the two foci of the conic). The departure section 20 is to be added to the base conic, and curved shape 30 represents the sum of the two. In other words, that is, curved shape represents the total freeform surface that results from the base surface 10 and the added departure 20. The small arrows in FIG. 2 represent the departure that is added to the base surface shown at a discrete set of points. These are all parallel to the axis of the conic and signify that the departure is added in the direction of the axis of the conic.

Figure 3:
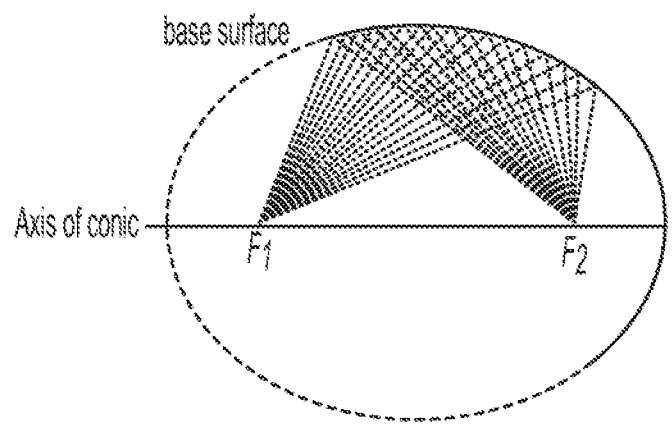
FIG. 3 depicts a representation of a base surface represented by an off-axis section of a conic, in accordance with one embodiment of the present invention.

The departure may be represented by a set of basis functions that allow an arbitrary surface to be described provided the surface is continuous and smooth. FIG. 3 shown an off-axis conic optical surface.

Figure 4:
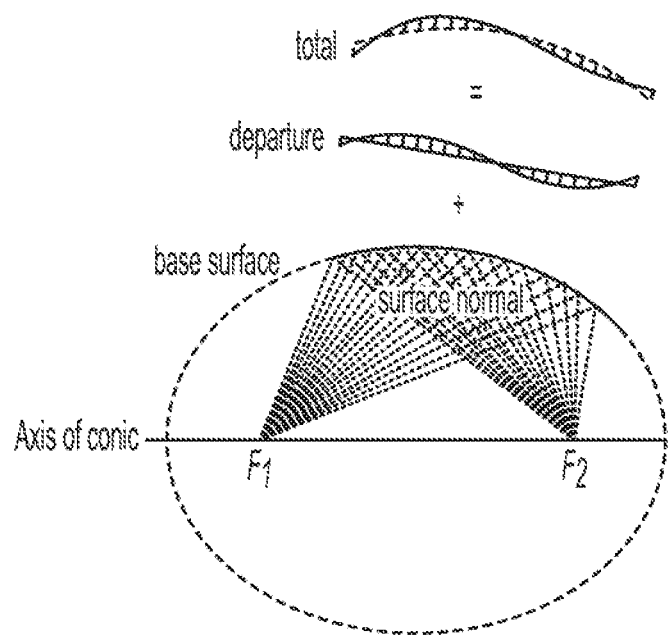
FIG. 4 depicts a schematic representation of a base surface plus additional departure, where the departure is applied in a direction parallel to the surface normal at or near the center of the used-portion of the surface, in accordance with one embodiment of the present invention.

In accordance with some embodiments of the present invention, for the design of freeform surfaces that are specified as a base-surface plus some departure, the departure is applied in a direction substantially normal to the surface at or near the center of the used-portion of the surface. That is, the direction of the added departure is not tied to any underlying symmetry of the base surface. This is illustrated schematically in FIG. 4 for the off-axis section of the base surface shown in FIG. 3. For cases where it is desired (perhaps for reasons of testability or manufacturability) that a freeform surface not deviate too much from an off-axis section of a base conic, embodiments of the present invention significantly simplify the set of optimization constraints needed, for example, to ensure that such a requirement is met.

Although embodiments of the present invention are described with reference to base surfaces that are conics-of-revolution (because of the history and importance of such surfaces in optical design), it is understood that embodiments of the present invention equally apply to any base surface, conics or otherwise. For example, cartesian ovals represent an example of an alternative class of base surfaces that could be used.

In order to realize a freeform surface of the form of a base surface plus additional departure, where the departure is added in a direction along the surface substantially normal of a point on the surface at (or near) the center of the used portion of the surface, it is useful to represent the base surface in a coordinate system that is located at this point and where this coordinate system is aligned with the surface normal. One embodiment uses an off-axis conic as the base surface. As such, a description of a conic of revolution in a coordinate system that is located off-axis and aligned with the surface normal at this off-axis point is provided herein.

Figures 5, 6:
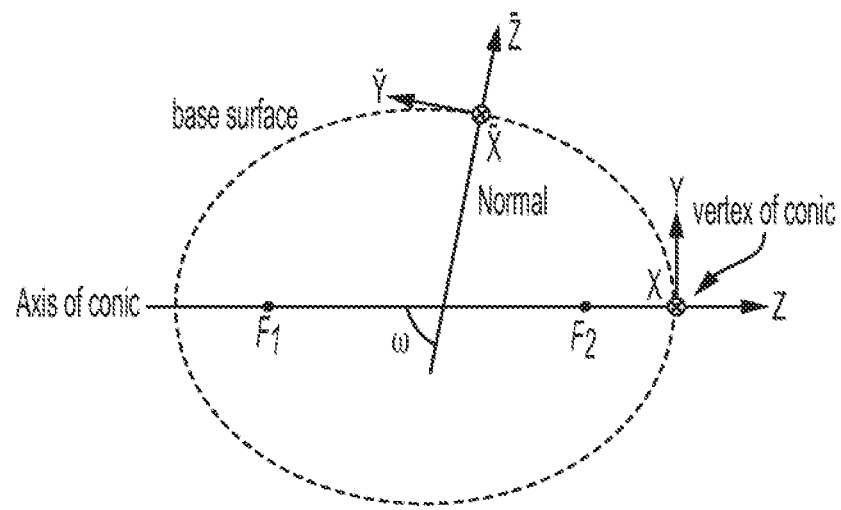
FIG. 5 depicts a schematic illustration of parameters for specifying an off-axis conic, in accordance with one embodiment of the present invention.
FIG. 6 depicts Equation 1.

Consider the equation of the surface in a Cartesian coordinate system whose origin is located at the vertex of the conic and whose axes are aligned with the conic axis. Such a coordinate system is depicted in FIG. 5. In such a coordinate system, the equation of the conic can be written as Equation 1, shown in FIG. 6, and implemented as a first module (including hardware and/or software) for use by a tool to model the freeform surface. In equation (1), c is the axial curvature of the conic and x is the conic constant.

In order to represent the surface in an off-axis coordinate system, the location of an off-axis point on the surface at which the coordinate origin is located is specified by the angle that the surface normal at this off-axis point makes with the axis of the conic. This angle is labeled as co in FIG. 5. Use of Equation 1 along with a translation and rotation of the coordinate system results in the equation of the conic in the off-axis coordinate system. See for example, Octavio Cardona-Nunez, Alejandro Cornejo-Rodriguez, Rufino Diaz-Uribe, Alberto Cordero-Davila, and Jesus Pedraza-Contreras, "Conic that best fits an off-axis conic section," Appl. Opt. 25, 3585-3588 (1986). Equation 2 is shown in FIG. 7A, where k1 and k2 are given by the equations shown in FIG. 7B. Equation 2 may be implemented as a second module for use by the tool to model the freeform surface.

By using the angle co to specify the off-axis location of the coordinate origin, it ensures that the representation of the base surface remains stable during optimization when the used-portion of the surface contains points on the surface that are parallel to (or nearly parallel to) the axis of the conic.

Given the equation of the surface in this off-axis coordinate system (Equation 2), departure may be applied from the base surface along the normal to the surface at the off-axis point as indicated in Equation 3 and shown in FIG. 8, which may be implemented as a third module for use by the tool to model the freeform surface.

To be useful in the context of freeform optical surface design software, the equation of the surface and the direction of the surface normal (specified in this off-axis coordinate system) are used. The surface normal is needed to determine the directions of refracted or reflected rays at the surface. The surface normal in the off-axis coordinate system, referred to as Ñ, is found by differentiating Equation 3 as shown in FIG. 9. The derivatives of the piece that depends on the added departure from the base surface [i.e., D(tilde-x, tilde-y)] depends on the particular representation being used for the added departure. The derivatives of the base surface itself come from differentiating Equation 2.

The use of an off-axis conic as the base surface is predicated on the premise that such a base surface can itself be manufactured and tested. The choice of representation for the additional departure determines how difficult it is to determine how the total surface deviates from the base surface. As previously mentioned, Zernike polynomials and Forbes freeform Q-polynomials are two common choices for this additional departure. The root-mean-square (RMS) sag departure from the base surface is determined from the coefficients of Zernike polynomials, while the RMS slope-departure is determined from the coefficients of the Forbes freeform Q-polynomials. Both of these polynomials also offer the degrees of freedom needed to correct the aberrations seen in systems that lack rotational-symmetry. Therefore, it is seen that this embodiment of a base surface represented by an off-axis conic plus some additional departure satisfies the desired properties for a freeform surface representation.

Figure 10:
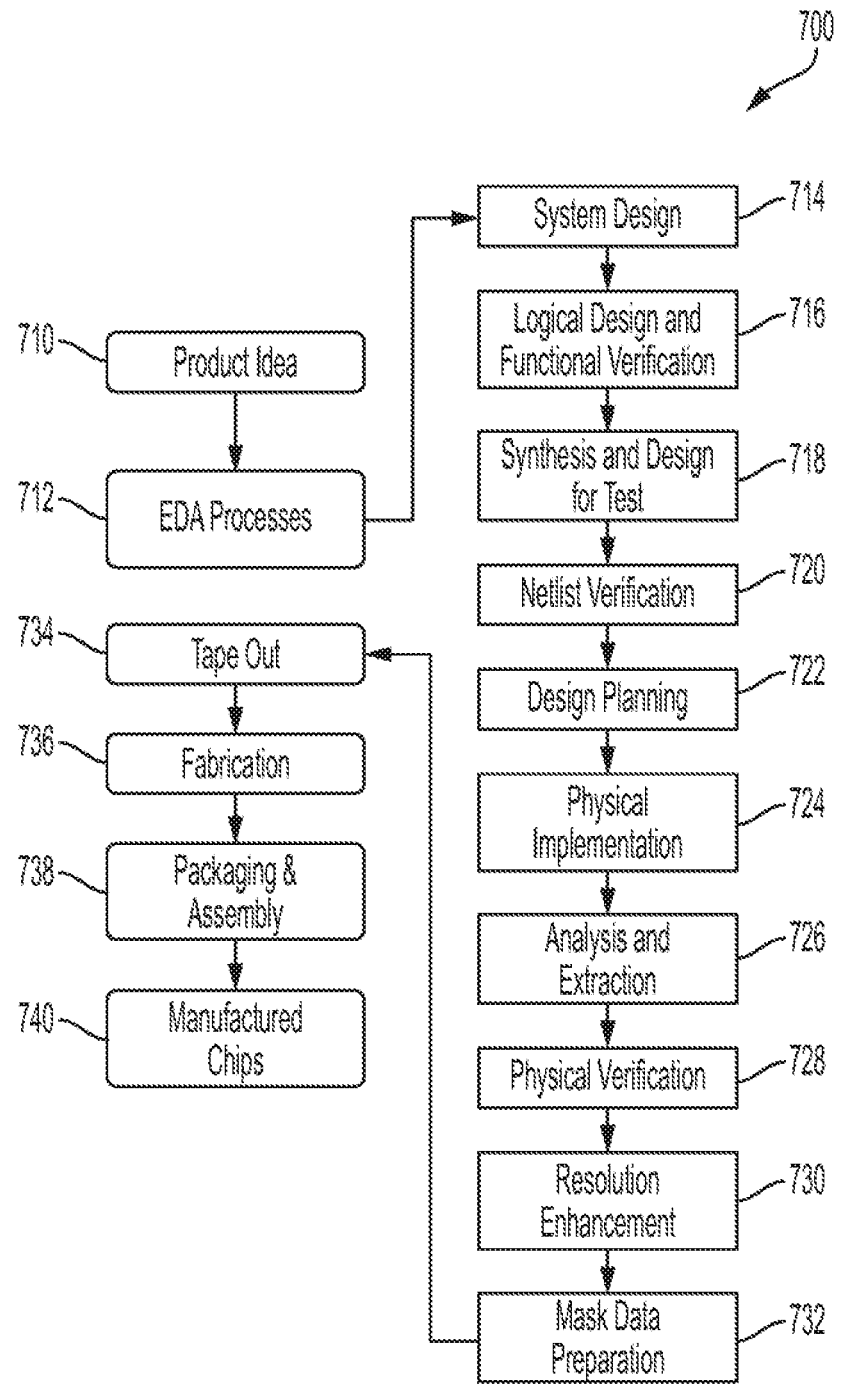
FIG. 10 depicts a flowchart of various processes used during the design and manufacture of an integrated circuit in accordance with some embodiments of the present disclosure.

FIG. 10 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 7. The processes described by be enabled by EDA products (or tools).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 900 of FIG. 11) may be used to store the programs and data structures that are used by some or all of the EDA products described herein, and products used for development of cells for the library and for physical and logical design that use the library.

Figure 11:
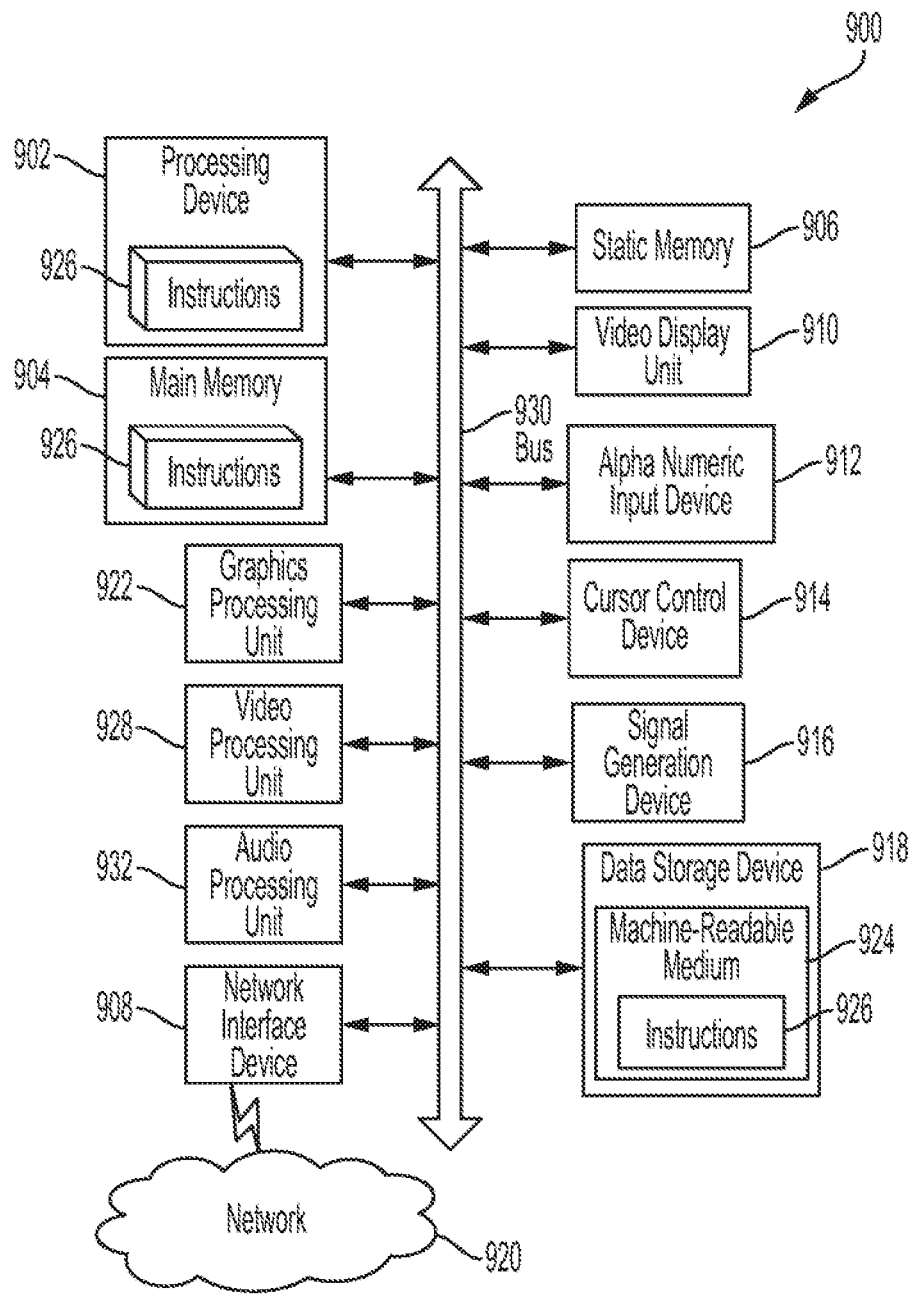
FIG. 11 depicts an abstract diagram of an example computer system in which embodiments of the present disclosure may operate.

FIG. 11 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A freeform optical surface comprising:
   an off-axis optical surface, wherein the off-axis optical surface is associated with a conic optical surface characterized by a first parameter defining an axial curvature of the conic optical surface, and wherein the freeform optical surface is characterized by an angle of the off-axis conic optical surface with respect to an axis of the conic optical surface; and
   a departure optical module having an associated surface height and slope that are different from a surface height and slope of the off-axis optical surface, the departure optical module adapted to be combined with the off-axis optical surface to form the freeform optical surface.

2. The freeform optical surface of claim 1 wherein said departure optical module is substantially perpendicular to the off-axis conic optical surface.

3. A method of forming a freeform optical surface comprising:
   forming an off-axis optical surface, wherein the off-axis optical surface is associated with a conic optical surface characterized by a first parameter defining an axial curvature of the conic optical surface, and wherein the freeform optical surface is characterized by an angle of the off-axis conic optical surface with respect to an axis of the conic optical surface;
   forming a departure optical module having an associated surface height and slope that are different from a surface height and slope of the off-axis optical surface; and
   combining the off-axis optical surface and the departure optical module to form the freeform optical surface.

4. The method of claim 3 wherein said departure optical module is substantially perpendicular to the off-axis conic optical surface.

5. A non-transitory computer readable medium comprising stored instructions, which when executed by a processor, cause the processor to:
   form an off-axis optical surface, wherein the off-axis optical surface is associated with a conic optical surface characterized by a first parameter defining an axial curvature of the conic optical surface, and wherein the freeform optical surface is characterized by an angle of the off-axis conic optical surface with respect to an axis of the conic optical surface;
   form a departure optical module having an associated surface height and slope that are different from a surface height and slope of the off-axis optical surface; and
   combine the off-axis optical surface and the departure optical module to form the freeform optical surface.

6. The non-transitory computer readable medium of claim 5 wherein said departure optical module is substantially perpendicular to the off-axis conic optical surface.

* * * * *